United States Patent [19]

Kauschke

[11] 4,200,341
[45] Apr. 29, 1980

[54] BEARING SEALING ARRANGEMENT

[75] Inventor: Wolfgang Kauschke, Haan, Fed. Rep. of Germany

[73] Assignee: Glacier GmbH-Deva Werke, Stadtallendorf, Fed. Rep. of Germany

[21] Appl. No.: 869,231

[22] Filed: Jan. 13, 1978

[30] Foreign Application Priority Data

Jan. 17, 1977 [DE] Fed. Rep. of Germany ....... 2701672

[51] Int. Cl.² .................... F16C 29/00; F16C 33/74; E01D 19/06
[52] U.S. Cl. ........................................ 308/3.5; 14/16.1
[58] Field of Search ................... 308/3 R, 5 R, 3.5; 14/16.1; 248/22; 52/169.1, 169.9

[56] References Cited

U.S. PATENT DOCUMENTS

| 3,728,752 | 4/1973 | Andra et al. | 14/16.1 |
| 3,986,222 | 10/1976 | Miyazaki | 14/16.1 |
| 4,006,505 | 2/1977 | Koster et al. | 308/3 R |

FOREIGN PATENT DOCUMENTS 57872  9/1967  German Democratic Rep. ...... 14/16.1

Primary Examiner—Charles E. Frankfort
Attorney, Agent, or Firm—Haseltine, Lake & Waters

[57] ABSTRACT

A sealing arrangement for a sliding bearing for carrying heavy loads in which two plate-shaped bearing metal sections are displaceable relative to each other. These are provided with sliding plates fastened between them. One of these is larger than the other, and a lubricant is applied between the sliding plates. A sealing strip encloses the sliding surface at a distance therefrom, and carries the smaller sliding plate. It also adheres to the larger sliding plate. A gap is formed between the sealing strip and the sliding surface or smaller sliding plate, and this gap is completely filled with lubricant. The sealing strip is made of flexible material, and may be stretched elastically under the pressure of the initial lubricant filling the gap. The sealing strip, furthermore, may be made of spongy absorbent material with a U-shaped cross section, while being open towards the larger sliding plate which is provided with its own lubricant filling. The sealing strip may also have a hollow cross section and be filled on the inside with a medium under pressure which may be gas. The medium may, moreover, be under pressure which is regulatable. An armor may be provided for preventing radial enlargement of a sealing ring formed by the sealing strip.

8 Claims, 7 Drawing Figures

BEARING SEALING ARRANGEMENT

BACKGROUND OF THE INVENTION

The present invention relates to a sealing arrangement for a sliding bearing for carrying heavy loads, in which two plate-shaped bearing sections of metal, displaceable relative to each other, are provided with sliding plates fastened between them. One of the plates is larger than the second one. Lubrication is applied between the sliding plates. A sealing strip encloses the sliding surface at a distance and carries the smaller sliding plate as well as adheres to the larger sliding plate. Between the sealing strip and the sliding surface or smaller sliding plate a gap is formed.

When using bearings for heavy loads it is necessary to keep the friction losses as small as possible. To achieve this, much attention must be given to the selection of suitable sliding mating parts or sliding materials; also, care must be taken that the lubrication of friction surfaces is most efficient and long-lasting. However, because of the heavy loads, the build-up of a lubricating film is greatly impeded and, if such a lubricating film is actually present (e.g., directly after installing a bearing if the sliding surfaces are lubricated before installation), squeezing out of the lubricant layer from the sliding surfaces occurs due to the relative motion of the sliding mating parts against each other.

Another problem is that the entry of dirt from outside the bearing into the sliding surface is effectively prevented. Upon the entry of dirt or other contamination into the sliding surface, not only is the lubricant film that is present there disturbed, but there is increased abrasion and an unwanted rise of the friction coefficient of the sliding bearing.

With a known bridge bearing (German Pat. No. 1,230,826), an attempt has been made to ensure the feeding of lubricant into the lubricant of the sliding layer by providing lubricant storage locations in one of the two sliding surfaces which are made of polytetrafluoroethylene. However, with this bearing, the lateral squeeze-out of lubricant cannot be prevented. For this reason servicing the bearing throughout its useful life is indispensible. Also, no measures are provided to prevent the entry of foreign matter from the outside.

Further attempts have been made to relieve the sliding bearing from the acceptance of so-called "minimum movements" by combining such a sliding bearing, provided with lubricant storage cells in one sliding surface, with a deformation bearing. These "minimum movements" arise from traffic movements, etc. As a result, after the decay of movements, occurring within a certain period after installation of the bearing, resulting from pre-tension, creep and fading, during the subsequent period the deformation bearing, which by itself requires no maintenance, must be effective to receive the still remaining movements. However, up to that time, the full effectiveness of the sliding bearing mnust be maintained: since with these known bearings neither measures against the squeezing out of lubricant from the sliding surface nor against the entry of dirt from the outside have been described before, continuous servicing of the bearing remains indispensable at least during the period when larger movements require the full effectiveness of the sliding bearing.

In order to combat the contamination of the sliding surfaces, various technical approaches were made. The "Texte der allgemeinen bauaufsichtlichen Zulassungen (texts of general building permit regulations)" (as of May 1973—cited from: Eggert/Grote/Kauschke: "Lager im Bauwesen (bearings in the construction industry)" provide that "the sliding surfaces ought to be protected suitably against contamination (dirt)." In section 6.2.7 (corrosion and dirt) the use of bellows located horizontally underneath the sliding surfaces is recommended. With other known sealing arrangements for such sliding bearings for carrying heavy loads, a sealing strip enclosing the slide surface at a distance, is fastened to the smaller sliding plate and adheres to the larger sliding plate.

These known sealing arrangements are well suited for effectively preventing contamination, etc., of the sliding bearing from the outside. However, the squeeze-out of lubricant from the sliding surface under high pressure is not yet prevented or eliminated by the known sealing arrangements; for this reason sliding bearings for heavy loads equipped with such sealing arrangements require a continuous servicing of the sliding bearing; this in turn makes it necessary that the sealing arrangements used can be easily disassembled.

Based on this state of the art, it is the object of the present invention to provide a sealing arrangement of the above type in such a way that preservation of the lubricant layer between the sliding surfaces of the sliding bearing lasts longer than with previously known sealing arrangements, and at the same time effectively preventing the entry of dirt, etc., from outside the bearing.

Another object of the present invention is to provide an arrangement of the foregoing character which is substantially simple in construction and may be economically fabricated.

A further object of the present invention is to provide an arrangement, as described, which may be readily maintained in service and which has a substantially long operating life.

SUMMARY OF THE INVENTION

The objects of the present invention are achieved by providing that the gap between the sliding surface (or the smaller sliding plate) and the sealing strip is completely filled with lubricant and the sealing strip itself is of flexible material.

With the sealing arrangement in accordance with the present invention, the gap completely filled with lubricant which immediately follows the sliding surfaces, assumes the function of a sealing device which nearly prevents the flow-out of lubricant retained by the sliding surface. At the same time, the sealing strip made of flexible material constitutes not only an effective protection against the entry of undesirable dirt; also, due to the expressly required flexibility, a complete adherence or fit of this sealing strip to the (larger) sliding plate adhering to it and moved relative to it is certainly present, effectively ensuring sealing of the gap against squeeze-out of the lubricant retained in the gap.

The use of a sealing arrangement in accordance with the present invention with a sliding bearing combined with a deformation bearing, in some fields of application, e.g., bridge construction permits the use of a bearing virtually free from maintenance. For example, in this application it has been found that certain larger movements resulting from pre-tension, creep and fading occur only during a certain period after installation of the bearing. One may assume that such movements occurred immediately after the prestress procedure and 60 to 80% of the movements from fade and creep occurred during the course of about 12 months after installation.

The remaining movements from fading and the movements up to 80% creep will be finished after about 5 years. In this important application for such bearings, the sealing arrangements must maintain the sliding bearing portion fully functioning only within this period, since the later movements due to temperature changes and about 20% residual creep can be absorbed by the full horizontal deformability of the deformation bearing (such as an elastomer bearing). The very small horizontal movements resulting from traffic are taken care of by the deformation bearing (as previously) which is free from maintenance.

The sealing arrangement in accordance with the present invention makes it possible to seal a sliding bearing for such uses, so completely, at least during the timespan mentioned, that adequate lubrication is always ensured within the sliding bearing surface. Servicing the bearing can be dispensed with because—when later the bearing has actually run dry and increased friction coefficients result—in any case the deformation bearing can perform the full bearing function still remaining (also without servicing). After expiration of the above-mentioned run-in period, the movements described can no longer be expected; for this reason the service-free deformation bearing is completely adequate as effective bearing. The sliding bearing which must be fully effective only during this run-in period is easily kept fully functioning by using the sealing arrangement in accordance with the present invention without requiring re-lubrication or service during this period. Such a bearing combination for bridges can be considered a "service-free" bearing.

An advantageous emobidment of the sealing arrangement in accordance with the present invention is the fact that the sealing strip is stretched elastically under the pressure of the initial lubricant filling in the gap. As a result, the sealing strip can contract again if the lubricant filling in the gap diminishes; this ensures that there always remains a completely filled lubrication gas (even with decreasing lubricant volume in the gap) and hence the desired good sealing against departure of the lubricant from the sliding surface. There always occurs a pressure balance (compensation) between the pressure of the lubricant in the gap and the elastic contraction forces of the sealing strip. The pressure in the gap is built up as follows:

Before the sliding bearing is assembled, the individual sliding plates and the gap are completely filled with lubricant and then the bearing is assembled. After assembly and application of the heavy loads the bearing settles, e.g., by a certain yielding (deflection) of the PTFE sliding plate of the lower bearing portion which results in a pressure increase in the gap already completely filled with lubricant. The lubricant under the heavy load of the bearing in the sliding bearing itself is the reason why, if it would leave the sliding surface, it arrives with the pressure still remaining in pressure compensation with the pressure in the lubrication gap. On the other hand, a suitable control of the pressure in the lubrication gap might bring about not only a squeeze-out of the lubricant from the sliding surface, but rather a tendency to squeeze-in the lubricant located in the lubrication gap. This would not even require that the lubricant located in the lubrication gap be brought to a pressure corresponding to the thrust of the sliding bearing, which would give to the lubrication gap itself a supporting function. The lubricant in the sliding surface, when it departs from the sliding surface, and because of considerable channel losses, it is no longer under the direct thrust of the sliding bearing. As a result, the lubricant in the lubrication gap would merely need an intermediate pressure between this exit pressure and the thrust not only to safely prevent exit, but would exhibit a certain squeeze-in tendency at least on the edge of the sliding surface.

Of course, one will not be able to prevent, in case of a relative movement between the sliding plate, that lubricant from the lubricating surface adheres to the upper sliding plate and gets into the area of the lubrication gap if, during the movement from the sliding surface, it gets into the area of the lubrication gap. On the other hand, on the other side of the sliding surface that part of the upper sliding plate which enters the sliding surface from the lubrication gap will, in turn, introduce into the sliding surface lubricant which adheres to it from the lubrication gap. Thus, there is an exchange, even though slower and smaller, of the lubricant present in the sliding surface with new lubricant supplied from the gap which benefits the life of the lubricated sliding bearing.

As material for the sealing strip, any suitable flexible material can be used. Particularly favorable is the use of polybutadiene or silicon vulcanized goods since they ensure both the desired flexible behavior and the required inherent stiffness which is desirable for the use of profiled sealing strips with stripping edges ets.

Also advantageous is the use of a spongy absorbent material, such as foam rubber or a suitable felt. With its assistance, the sealing strip to a certain extent absorbs lubricant from the lubrication gap, resulting in increased sealing effect in the surface contacting the larger sliding plate and an increased dirt rejection.

A preferred embodiment of the sealing arrangement in accordance with the present invention is that the sealing strip has a U-shaped cross section open towards the larger sliding surface; this cross section has its own lubricant filling. It creates, furthermore, a second lubricant reservoir inside the sealing strip itself, which in the very rare cases of leakage (due, for example, to damage) in the sealing strip portion closing off the lubrication gap, it makes possible closing of the leaky spot by the lubricant from the sealing strip itself. With suitable design of such a sealing strip it is even possible to strip off dirt particles (from the outside) adhering to the larger sliding plate, or abraded particles (from the sliding bearing) in such a way that they can be deposited in the sealing ring which then serves as a reservoir for such deposits.

Another advantageous embodiment of the sealing arrangement in accordance with the present invention is to make the sealing strip out of a flexible hose filled with lubricant; this hose has openings in the direction of the larger sliding plate. Here the sealing strip is made of an easily produced element which again serves as an additional lubricant reservoir and has the abovedescribed improvement of the sealing effect on the surface contacting the larger sliding surface.

The sealing strip for a sealing arrangement in accordance with the present invention may be designed so that it has a hollow cross section and is filled on the inside with a pressure medium which is gas preferably. A convenient embodiment has the sealing strip made of a flexible hose. With such an embodiment it is possible to make the pressure of the preferably compressible pressure medium in the sealing strip for the particular application in such a way, that desired contact conditions relative to the adjacent larger sliding plate are produced. For special applications it may be a great advantage when the pressure of the pressure medium in the sealing strip, when installed, is regulatable. This would require location of a suitable regulating device on the sealing strip, e.g., a suitable valve; in return, in the presence of widely varying bearing loads, one might achieve an adaptive contact behavior of the sealing ring which, in some applications, may be very useful.

Preferably, the sealing strip is provided with an armor which does not permit a radial increase of the sealing ring formed by the sealing strip. This has the advantage that the forces exerted by the pressure of the lubricant in the gap on the sealing strip can be largely absorbed by the armor.

The position of the sealing strip inside the sealing arrangement will depend on whether the lubrication gap itself is to have an appreciable deposit effect, or whether the emphasis is on the sealing effect of the lubrication gap filled with lubricant. In the former case, the sealing strip is located away from the edge of the smaller sliding plate (which is the outer boundary of the sliding surface) by a distance which is about 1.5 times the cross sectional width of the sealing strip.

In the second case above, it is recommended that with a sealing arrangement where the smaller sliding plate is made of an encapsulated material, such as preferably PTFE that the sealing strip be located away from the edge of the smaller sliding plate an amount of at least twice the cross section width of the setoff (step) caused by the casing.

Another advantageous embodiment of a sealing arrangement in accordance with the present invention is to make the sealing strip only in the region contacting the larger sliding plate and in the region facing the gap, from a spongy material, and to make it in the other regions from an impermeable flexible material. As a result, in the area contacting the larger sliding plate, the increased sealing effect already shown is achieved, with a sort of relubrication of the sealing strip supplied by the lubrication gap through the spongy inside material of the sealing strip. The impermeable regions of the sealing strip, located on the outside of the bearing, prevent influences which might lead to drying of the lubricant in the sealing strip or to a deposit of dirt on the outside of the sealing strip which is saturated with lubricant.

As lubricant for the lubrication gap, one may use any suitable lubricant, particularly the officially permitted lubricants. One may also use high-viscosity pastes or high-viscosity oils which reduce the tendency for squeeze-out of the lubricant present in the sliding surface and hence increase the period between servicing the bearing considerably. In some cases, a stabilized anti-corrosion agent may be used to advantage.

The sealing arrangement in accordance with the present invention prevents not only a penetration of dust and a breakdown (reduction) of the lubricant film in the sliding surface; it also protects against the harmful effect of ultraviolet rays and the entry of corrosive elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
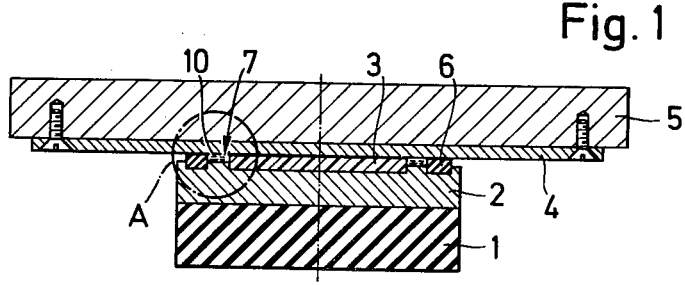
FIG. 1 shows a cross-section of a sliding bearing equipped with a sealing arrangement in accordance with the present invention and combined with a deformation bearing.

FIG. 1 shows a sliding bearing in cross-section and installed for heavy loads which might be used, for example, as bridge bearings. The bearing comprises a deformation bearing 1, (for example, an elastomer pivot bearing), which may be supported by a solid base (e.g., a bridge pillar or a bottom pillar), and a sliding pillar having a lower bearing portion 2 and an upper bearing portion 5. Between the lower bearing portion 2 and the upper bearing portion 5, there is a lower sliding plate 3 and an upper sliding plate 4 which contact each other within a contact zone (sliding surface). The material for the two sliding plates 3 and 4 is chosen so that the material is paired with a minimum friction coefficient. For bridge bearings, for example, one choses for the lower sliding plate a PTFE sliding plate, with the PTFE being conventionally encapsulated, due to its creep property. In the selecting of the mating slide, the materials for the sliding plates are chosen so that one of the two is at least slightly harder than the other to prevent seizing or fusing between the sliding surfaces. Frequently, the chosen combination is PTFE for one sliding plate (in the embodiment of FIG. 1, the lower), while the other sliding plate, e.g., for bridge bearings, is made of polished steel (stainless steel), a hard synthetic (such as polyacetal) or hard-chrome plated metal surfaces or austenitic steel sheet. Such sliding pairs are restricted in use by official regulations; certain values for maximum edge pressure in the PTFE must not be exceeded; also the temperature range is restricted. When using such bearings where these load limits are exceeded, cermet sliding materials may be used instead of PTFE, for example, materials produced by powder metallurgy and containing solid lubricants (e.g., graphite, $MoS_2$, etc.).

In order to improve the sliding behavior of the two sliding materials and to reduce the start-up friction, the two sliding plates are equipped with an initial lubrication, which is provided by greasing the sliding surfaces 2 and 3 before assembling the bearing. As lubricants, use should be made of authorized silicon lubricants or high-viscosity pastes, oils, etc.; with certain applications, the use of stabilized anti-corrosion agents may be advisable.

With the bearing shown in FIG. 1, the lower sliding plate is smaller than the upper sliding plate and both sliding plates are attched rigidly to the associated bearing portions 2 or 5. Such bearings may also be used in installation positions other than shown, for example, in silo construction; then there are no more lower and upper sliding plates, but a right- and left-hand sliding plate.

The lower sliding plate 3 is surrounded ring or crown-like by a sealing strip 6 of flexible material; this strip is placed with its underside in the lower bearing portion 2 and its top-side contacts and seals the surface of the upper sliding plate 4 whose dimensions are such that even when using the largest sliding movement occurring with the sliding bearing, the sealing strip 6 is continuously in sealing contact.

Between the outer edge of the sliding surface which coincides with the outer boundary of the lower sliding plate 3, and the sealing strip 6 there forms a gap; on its underside it is bounded by the lower bearing portion 2 and on its upper side by the larger sliding plate 4. This gap is completely filled with lubricant 10. The lubricant filling of gap 7 prevents a lubricant loss in the sliding surface during a relative movement of the upper and the lower sliding surface is largely prevented; secondly, even lubricant which is moved from the sliding surface due to adhesion to the upper sliding surface 4, is supplemented (filled up) by the fact that on the upper sliding plate 4 location inserted on the other side of the sliding surface, lubricant is drawn from gap 7 which adheres to the sliding plate 4.

This ensures that a lubricant loss occurring in the sliding surface resulting from the relative movement, is compensated by an equally large introduction of fresh lubricant from gap 7, which is also caused by the relative movement. In any case, the lubricant film is prevented from vanishing from the sliding zone to the outside, since the gap 7 is completely filled with lubricant and escape of the lubricant from this gap 7 is prevented by the sealing strip 6.

The sealing arrangement shown, where the lubricant-filled gap 7 is followed by a sealing strip 6, stops such contamination which might perhaps penetrate in spite of the sealing strip 6 (for example, fine drift sand), since such contamination is prevented from penetrating to the sensitive sliding zone by the lubricant filling in gap 7. Thus the sealing strip 6 prevents the departure of lubricant and the entry of dirt from the outside, while the lubricant filling in gap 7 assumes the actual sealing function of the sensitive sliding zone.

Figure 2:
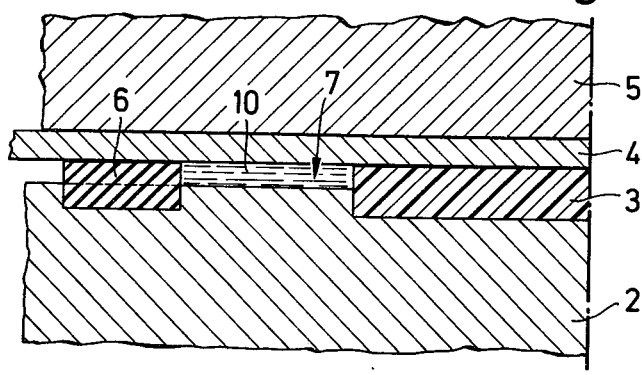
FIGS. 2 to 7 show various embodiments of the sealing arrangement denoted by A in FIG. 1.

The embodiment of FIG. 2 uses a sealing strip whose cross section has the form of a longitudinal, sharp-edged rectangle lying on its side. A different similar shape with preferably sharp stripping edges may be chosen. The flexible sealing strip 6 is recessed in a fitting groove in the lower bearing portion 2. This groove in the example shown, extends to the middle of the cross section of sealing strip 6 and prevents an undesirable displacement of the sealing strip 6. The sealing strip itself may be made of any suitable flexible material, preferably polybutadiene vulcanized goods or silicon vulcanized goods which ensure a certain stiffness of sealing strip 6 in spite of adequate flexibility. Because of the sharp-edge design of the sealing strip, the entry of coarse dirt can be easily prevented while safely preventing the oozing out of lubricant. In all embodiments shown or following, it might be advantageous to make the sealing ring 6 spongy or porous, by using foam rubber or felt. In this case the sealing ring becomes saturated with lubricant which leads to improved sealing effect in the contact surface of the sealing strip 6 with the larger sliding plate 4. However, in such a case the sealing ring to a certain extent, absorbs lubricant which it strips from the upper sliding plate 4 in case of relative displacement of the two bearing portions. The abraded material produced at the outset when the two sliding plates 3 and 4 grind against one another, is perhaps transported directly from the upper sliding plate 4 via the sealing gap 7 to the sealing strip 6. This material can be stripped and received there; hence such abraded material which during its feedback (return) might again damage the sliding zone, cannot get into the sliding zone with the clean lubricant contained in the gap 7. It is also possible to make the sealing strip 6 out of several parts, for example, a highly absorbent inside and a less absorbent outside; lubricant stripped by the sealing strip 6 is pressed through the highly absorbent portion as through a filter, so that dirt and abrasion deposit in this portion as in a sponge while the lubricant itself is at least partially returned to the reservoir with clean lubricant in gap 7.

Figure 3:
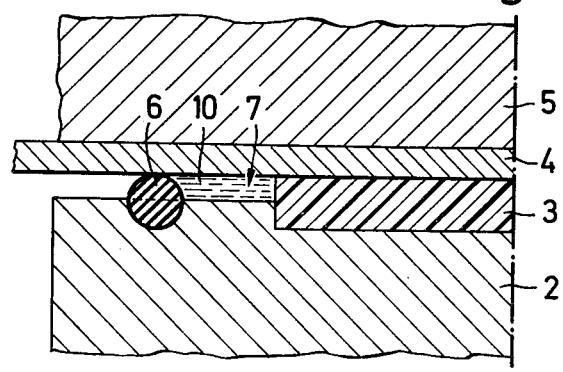

The embodiment shown in FIG. 3 shows a sealing strip 6 of circular cross section embedded again in a holding groove (up to the middle of its cross section) in the lower bearing portion 2. With this embodiment, the sealing strip 6 can be pressed together over a relatively wide tolerance range so that, when machining the groove which holds the sealing strip 6, relatively large tolerances can be retained without effecting the usefulness of the sealing strip. Because of the wedge effect between the surface of the sliding plate 4, on the one hand, and the shape of the sealing strip 6 at the sealing surface, on the ther hand, the lubricant adhering to the sliding plate 4 coming from inside the bearing is forced into the sealing ring 6, with dirt in the lubricant safely deposited on the sealing strip 6.

Figure 4:
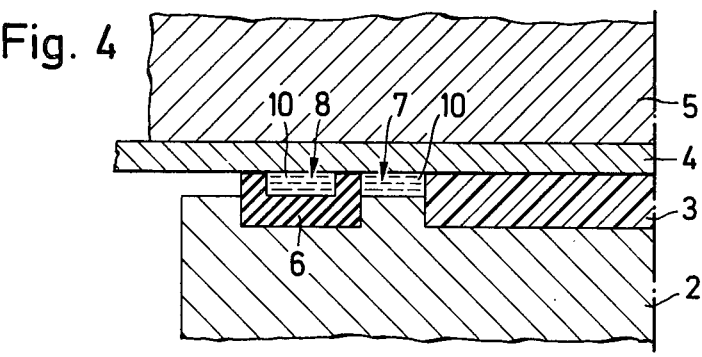

In the embodiment of FIG. 4, the sealing strip 6 has a U-shaped cross section whose opening 8 is at the top facing the upper sliding plate 4. The sealing strip 6 is recessed up to half of its height into a groove in the lower bearing portion 2. The recess 8 extends up to half the height of the sealing strip 6 and has essentially a rectangular cross section. A rectangular edge is formed at the topside of sealing strip 6 on the two outside flanks (surfaces) and on the two side edges of recess 8. During assembly, the recess 8 is filled with lubricant like lubrication gap 7 where preferably the same lubricant is used as for lubricating the sliding surface. Again a porous absorbent material is chosen for the flexible sealing strip 6, as pointed out earlier. Even when using a slightly spongy material, the relatively sharp edges of the sealing strip 6 ensure that dirt stripping zones are formed where dirt is deposited which otherwise would get into the sliding zone between the two sliding plates 3 and 4; at the same time, a safe sealing of the lubricant-filled gap 7 against the outside is achieved.

Figure 5:
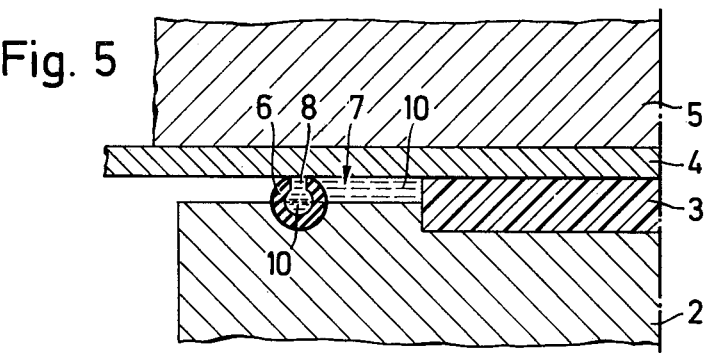

The embodiment of FIG. 5 is a combination of the embodiments of FIGS. 3 and 4. The sealing strip 6 comprises a flexible hose with circular outside circumference and concentric circular inside cross section which is open via a wide slot or a single opening 8 at the top to the upper sliding plate 4. Also with this embodiment, the sealing strip 6 is placed with half of its cross section into an associated recess (groove) in the lower bearing portion 2 so that it receives sufficient support while the sliding bearing is operated. During use of the sliding bearing, dirt or dirty lubricant adhering to the upper sliding plate 4 enters the recess due to the wedge effect, but is prevented from moving further by the sharp edge of the recess contacting the upper sliding plate 4 and is stored on the inside. As with the embodiment of FIG. 3, the one of FIG. 5 provides the additional possibility that in case of diminishing lubricant filling in gap 7, the lubricant may be supplied from inside the sealing ring 8 to refill gap 7.

It would also be possible to combine the embodiment of FIG. 4 with one of FIG. 5 such that a sealing strip is formed whose outside portion is shaped like the associated portion in FIG. 4 and whose inside portion is formed like the associated portion in FIG. 5 or vice-versa.

Figure 6:
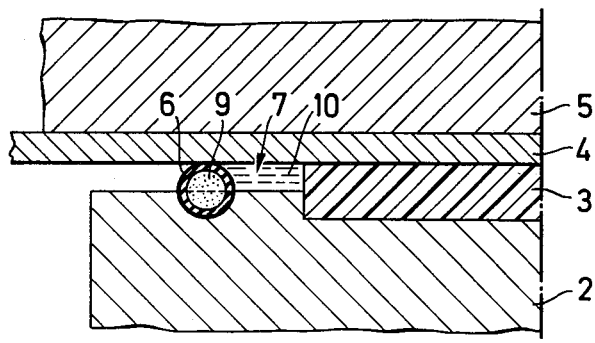

FIG. 6 represents another embodiment of a sealing arrangement which can be considered as modification of the embodiment shown in FIG. 3. The sealing strip 6 of flexible material has the form of a closed hose which has a closed hollow space 9 on the inside. This hollow space 9 is preferably filled with a pressure medium, preferably compressed air which provides the sealing strip 6 with the desired elasticity required for reliable sealing against the upper sliding plate 4. The pressure of this pressure medium can be chosen for any particular case so as to ensure a desired pressure force against the upper sliding plate 4. Hollow space 9 could also be filled with an indicating type of liquid whose appearance on the outside could indicate damage to the bearing.

It may also be useful to provide such sealing strips with a radially acting armor (for example, from steel wire), and to place it into a groove of similar shape so that upon consumption of lubricant from gap 7 there would be contraction of the sealing ring 6 which would ensure that gap 7 is completely filled even with decreasing volume of the filling, and the sealing of the sliding surface is ensured even if lubricant filling is lost.

Figure 7:
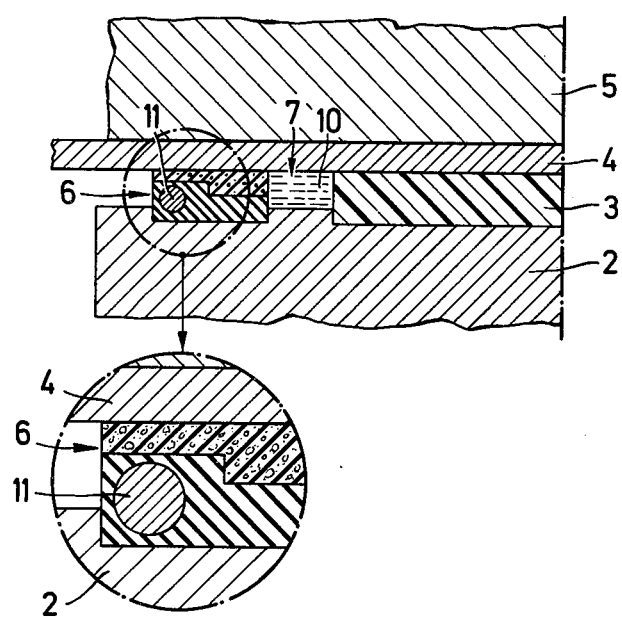

The embodiment shown in FIG. 7, shows a sealing strip 6 provided with an armor 11 which prevents the ring formed by the sealing strip 6 about the sliding surface from expanding in an undesirable manner. At the same time, the sealing strip on the side facing the outside and on its support surface on the lower bearing plate 2 is made of flexible but impermeable material. In its region facing sliding plate 4 at the top and the region facing the lubricant-filled gap 7, the strip is made of a spongy material, for example, foam rubber. This improves the sealing and lubricant action on top on the contact surface with the sliding plate 4. Simultaneous relubrication through the sealing strip 6, comes from the lubricant in gap 7, while the ring regions facing the outside of the bearing and supporting the sealing ring 6, have no undesirable alternate effects (reciprocal effects) toward the outside, because of their impermeability.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalents of the following claims.

I claim:

1. A sealing arrangement for a sliding bearing for carrying heavy loads, comprising: two plate-shaped bearing metal sections displaceable relative to each other; sliding plates fastened between said two bearing metal sections; one of said sliding plates being larger than the other; lubricating means applied between said sliding plates; a sealing strip enclosing a mutually sliding surface of said sliding plates at a distance therefrom and being supported by the bearing metal section carrying the smaller sliding plate, said sealing strip contacting and sealing the surface of the larger sliding plate; gap means formed between the sealing strip and the smaller sliding plate, said gap means being completely filled with lubricating means, and said sealing strip being of flexible spongy absorbent material and stretched elastically under pressure of initial lubricating means filling in said gap. means; said gap means filled with said lubricating means providing a pressurized source of said lubricating means to replenish the lubricating means between said sliding plates, said elastically stretched sealing strip maintaining said lubricating means in said gap means in a pressurized condition.

2. A sealing arrangement as defined in claim 1 wherein said sealing strip is spaced from the edge of the smaller sliding plate by a distance equivalent substantially to 1.5 times the cross section width of said sealing strip to define said gap means.

3. A sealing arrangement as defined in claim 1 wherein said sealing strip comprises a polybutadiene vulcanized material.

4. A sealing arrangement as defined in claim 1 wherein said sealing strip comprises foam rubber.

5. A sealing arrangement as defined in claim 1 wherein said lubricating means in said gap means comprises a high-viscosity paste.

6. A sealing arrangement as defined in claim 1 wherein said lubricating means comprises a stabilized anti-corrosive agent.

7. A sealing arrangement as defined in claim 1 wherein said sealing strip comprises a silicon vulcanized material.

8. A sealing arrangement as defined in claim 1 wherein said lubricating means in said gap means comprises oil.

* * * * *